June 30, 1942.　　T. G. SCHMEISER　　2,288,110
EARTH WORKING IMPLEMENT
Filed April 12, 1941　　2 Sheets-Sheet 1

INVENTOR.
T. G. Schmeiser
BY
Webster & Webster
ATTORNEYS

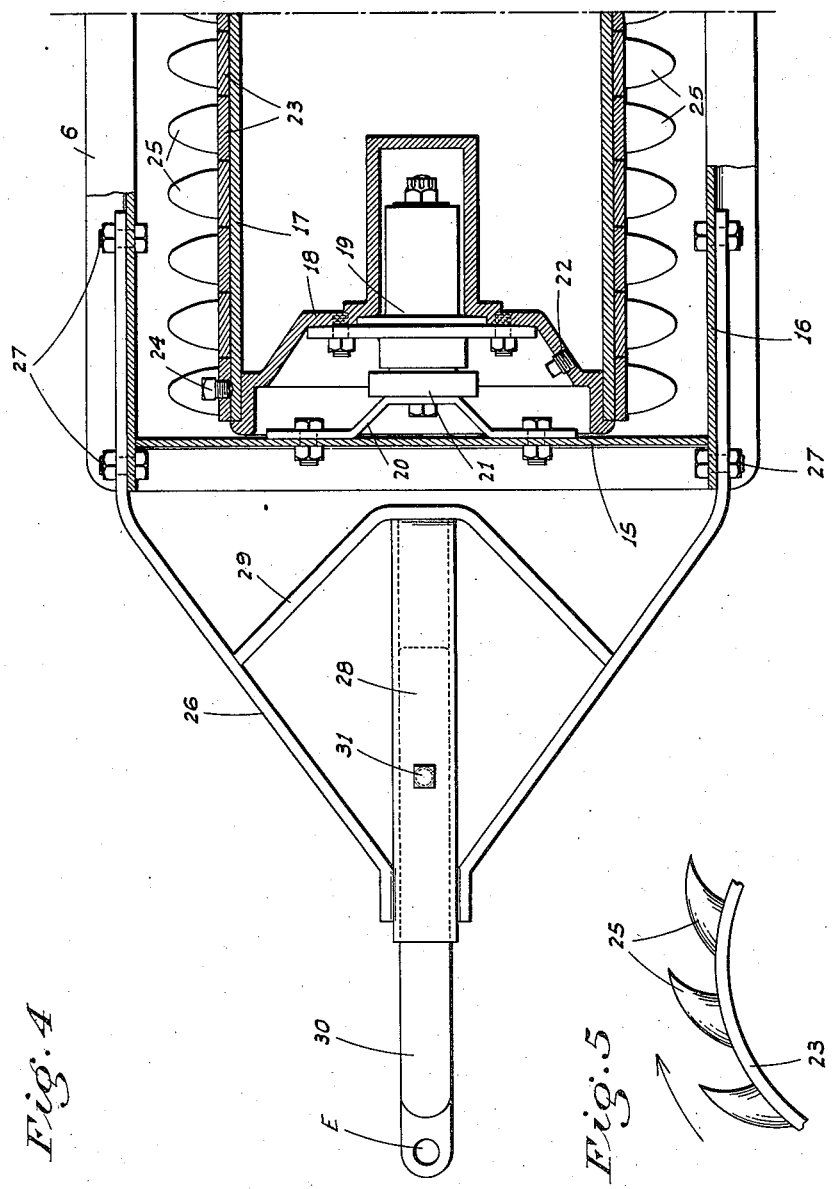

Patented June 30, 1942

2,288,110

UNITED STATES PATENT OFFICE 2,288,110

EARTH WORKING IMPLEMENT

Theodore G. Schmeiser, Fresno, Calif.

Application April 12, 1941, Serial No. 388,257

11 Claims. (Cl. 55—77)

This is an invention which in general is an improved earth working implement, and in particular the invention comprises improvements in seed bed preparing and cultivating implements.

In the preparation of seed beds, the soil, after being plowed, disced and harrowed, contains numerous air pockets which permit unnecessary drying of the soil and to an undue depth, and in addition to the top soil may be somewhat uneven and cloddy.

One of the objects of the instant invention is to provide an improved toothed roller type soil pulverizer which functions to firm the sub-surface and close such air-pockets, and to simultaneously pulverize the top soil to a depth of several inches.

Another object of the invention is to provide, in novel assembly, an earth drag and a toothed roller whereby when in operation such drag first works the soil to a given level and the toothed roller then compacts and pulverizes the soil as leveled.

A further object of the invention is to construct the earth drag in unique manner and so that it may be used effectively under varying soil conditions, such as wet or dry soil.

It is also an object of the invention to mount the roller in connection with the end beams of the supporting frame by means of bearings which are mainly disposed within the end portions of the roller so that said roller may have its ends disposed relatively close to said end beams; the advantage of such arrangement being that the effective or operating length of each roller unit is only slightly less than its overall length.

This invention, as a further object, contemplates the use of a novel connection assembly between the several toothed roller units when arranged for multiple gang operation, and the earth drag which precedes such units.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 4 is an enlarged sectional plan view of the end portion of one of the roller units.

Fig. 5 is an enlarged end view of a segment of one of the toothed annular bands or pulverizing and packer rings.

Figure 1:
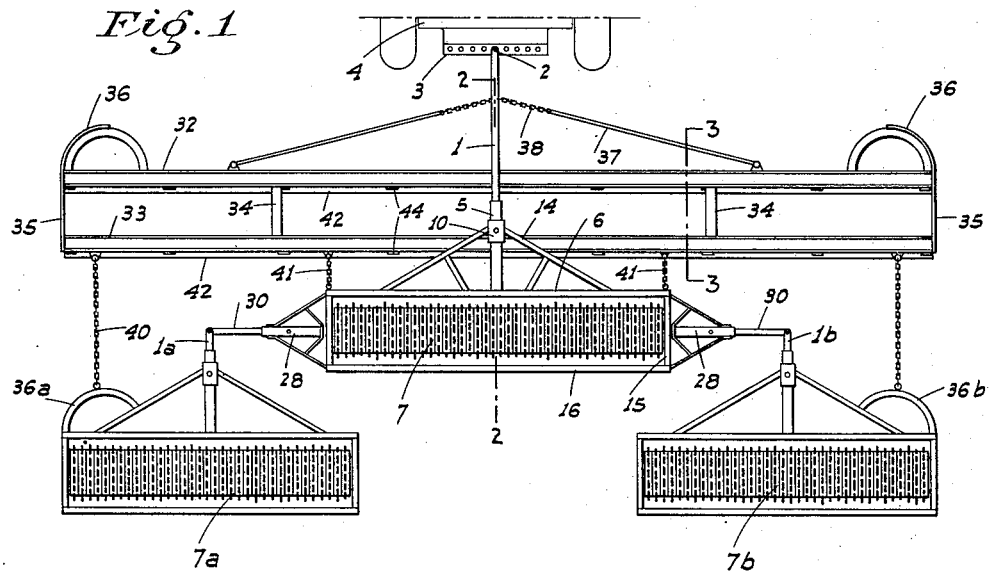
Fig. 1 is a diagrammatic plan view of my improved soil leveling, pulverizing and packing implement as arranged with multiple gangs.
Figure 2:
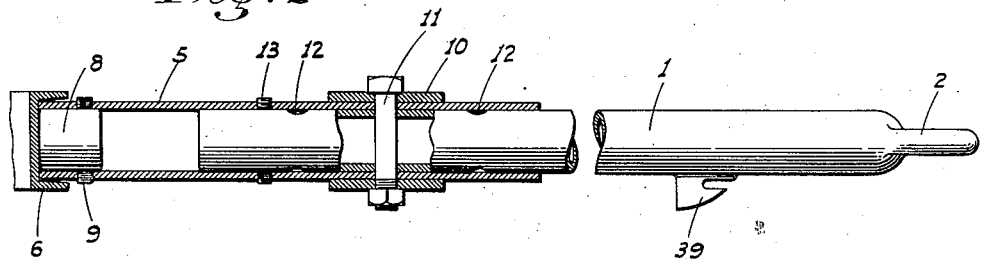
Fig. 2 is an enlarged fragmentary elevation, partly in section, on line 2—2 of Fig. 1.
Figure 3:
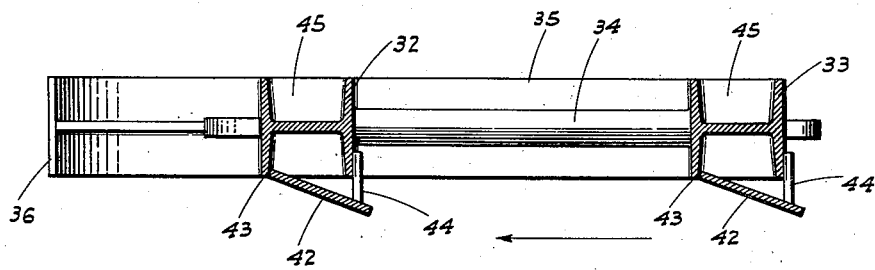
Fig. 3 is an enlarged cross section on line 3—3 of Fig. 1.

Referring now more particularly to the characters of reference on the drawings, the implement as shown in the present embodiment comprises a tubular tongue 1 of heavy duty pipe formed at its forward end with an eye 2 adapted for connection with the drawbar 3 of a tractor 4. The rear end portion of tongue 1 telescopes into a tubular pipe section 5 projecting horizontally forward from the front frame beam 6 of the leading roller unit indicated generally at 7, and hereinafter described in detail. Pipe section 5 engages over a boss 8 rigid with and projecting forwardly of frame beam 6, and is fixed to said boss by means of set screws 9. The section 5 is removable so that a section of greater length may be mounted if necessary to brace a relatively long tongue. A sleeve 10 surrounds pipe section 5 adjacent its forward end and is secured thereto by a bolt 11 which passes radially through said parts and through the telescoped tongue 1; the latter having longitudinally spaced matching sets of holes 12 so that the tongue may be adjusted lengthwise relative to the pipe section. Set screws 13 also secure the tongue 1 and pipe section 5 together. Diagonal bracing 14 runs from sleeve 10 in diverging relation to connection with frame beam 6.

The roller unit 7 comprises, in detail, an elongated, horizontally disposed frame having end beams 15 which connect front beam 6 and a rear beam 16; all of said beams being of channel configuration. A relatively large diameter, heavy gauge, tubular roller forming pipe section 17 extends longitudinally of the frame between the front and back beams thereof; the ends of this pipe section 17 being disposed quite close to end beams 15—as clearly shown in Fig. 4—whereby the effective length of the unit is only slightly less than its overall length.

The roller section 16 is fitted at each end with a head 18 disposed wholly within the end of said section, and such head is dished or concaved inwardly in such manner that a bearing assembly, indicated generally at 19, mounted axially on said head is likewise disposed entirely inwardly of the plane of the adjacent end of said section. A bracket 20 is mounted on the adjacent end beam 15, and the spindle head 21 of bearing 19 is rigidly secured thereto. This bearing assembly 19 is shown and described in full in my copending application, Serial No. 415,716, filed October 20, 1941. A filler plug 22 in the head 18 permits the roller section 17 to be filled with water to increase its weight.

A plurality of annular bands or packer rings 23 are engaged on roller section 17 from end to end thereof and in edge to edge relation; these rings engaging the roller section with a relatively close fit and, with the exception of the endmost ones which are secured by set screws 24, these rings are unsecured and may rotate independently of each other and relative to the roller section. Each ring is formed with a multiplicity of outwardly projecting teeth 25 which slope in one direction circumferentially of the ring, and such teeth are of lesser width than the ring and project from the latter centrally. The configuration of these teeth is such as to effect a self-cleaning action. For pulverizing the toothed rings rotate in the direction indicated in Fig. 5, and with the teeth sloping forward or in the direction of rotation, but for surface crust breaking after the seed bed is planted, the roller unit 7 is inverted, as can be done, so that a reverse rotation of the rings is obtained and with the teeth sloping opposite to the direction of rotation.

When the roller units are to be used in multiple gangs, as here shown, the frame of roller unit 7 is removably fitted with end extensions, each of which include arms 26 bolted at their inner ends to the end portions of front and rear beams 6 and 16, as at 27; these arms projecting laterally in converging relation and being attached at their outer ends on the outer end of a pipe section 28 disposed axially of the roller unit. The inner end of section 28 is secured to a cross brace 29. A tubular member 30 adjustably telescopes into section 28 and is adjustably secured therein by a set screw 31; the outer end of member 30 being formed with an eye E.

A pair of roller units or gangs, indicated generally at 7a and 7b and which are constructed substantially the same as roller unit 7, are connected by means of their tongues 1a and 1b respectively with the eyed ends of members 30 of the lateral extensions on roller unit 7. Units 7a and 7b are set to trail unit 7 with slightly overlapping paths.

A ground engaging drag is disposed between the tractor 4 and roller unit 7, and extends transversely of the direction of travel, and is of a length at least equal to the width of the effective path of the following roller unit or units. This width depends on whether the implement includes a single roller unit or multiple gang assembly. The drag is constructed and connected as follows:

The drag is elongated and includes spaced front and rear beams 32 and 33 respectively connected together by spaced and rigid tie members 34, and at the ends by metal plates 35 which extend ahead of beam 32 and curve inwardly as deflecting shoes 36 suitably braced from behind.

Draft rods 37 are pivoted to the front of beam 32 toward its outer ends and thence converge forwardly and terminate short of tongue 1; there being a chain 38 which connects the forward ends of said rods. This chain, intermediate its ends, engages a hook 39 on tongue 1 in adjustable but nonsliding relation.

A pair of chains 40 connect between the rear outer ends of the drag and the deflector shoes 36a and 36b at the forward outer ends of roller units 7a and 7b, while another pair of chains 41 connect the forward outer ends of roller unit 7 with the adjacent portion at beam 33.

The chains 38, 40 and 41 permit of certain lateral play of the drag and yet maintain the latter in proper and substantially parallel relation to the roller units. Of course if the implement includes only a single roller unit, then the drag is shorter and only chains similar to those at 41 are needed.

The beams 32 and 33 of the drag are H shape in section with one open side opening downwardly. Skid plates 42 extend longitudinally of the beams on one side thereof, such plates being secured along one longitudinal edge onto the leading longitudinal edge 43 of the beams and then—in a transverse plane—sloping away from the beam to a point rearwardly of said beams. Braces 44 are secured between the trailing edge of plates 42 and the corresponding edge of the beams. In wet soil, for example, the drag is disposed with the plates 42 lowermost and engaging the ground whereby to facilitate drag operation, while in dry soil the drag is in position with the plates 42 uppermost and the open side 45 of the beams 32 and 33 in ground engagement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the append claims.

Having thus described my invention, what I claim as new and useful and desire to secure by Letters Patent is:

1. An earth working implement comprising a roller unit including a frame, a tubular member projecting forwardly from the frame, means releasably securing said member in connection with the frame, a sleeve surrounding said member adjacent its forward end, diagonal brace elements between the frame and sleeve, a tubular tongue telescoped into the tubular member, and releasable securing means between said tongue and said tubular member.

2. An implement as in claim 1 in which said last named means comprises a radial bolt passing through said sleeve, tubular member, and tongue.

3. An implement as in claim 1 in which the connecting means between said tubular member and the frame comprises a boss projecting from the latter into the former in snug relation, and a set screw in the member seated against said boss.

4. An earth working implement comprising an elongated frame having end beams, a roller unit extending between said beams and including a relatively large diameter, tubular section whose ends are disposed short of but immediately adjacent said end beams, bearing assemblies secured in connection with said end beams within the circumferential plane of said section, depressed heads fitted in the ends of said section, said bearing assemblies being mounted axially on said heads and disposed mainly within said ends of the section, a plurality of packer rings surrounding said section and extending in edge to edge relation for the full length thereof, and means securing the endmost rings to the section; said rings having outwardly projecting, circumferentially spaced soil cultivating teeth.

5. In the combination which includes a roller unit having a frame, a rigid draft tongue projecting forwardly from the frame centrally of its ends, and an elongated drag disposed ahead of the roller unit and below the tongue; draft connections between the drag and tongue which comprise elements flexible in part connected between points on the drag symmetrically spaced from and on opposite sides of the tongue, and at a point on the tongue ahead of said drag.

6. In the combination which includes an elongated roller unit including a surrounding frame, a rigid tongue projecting forwardly from the frame centrally of the ends thereof, said tongue at its forward end being adapted for connection with a tractor, and an elongated drag disposed ahead of the roller unit and below the tongue; draft connections between the tongue and drag which comprise draft rods pivoted at their rear ends on the forward portion of the drag a substantial and equal distance from opposite sides of the tongue, the rods converging forwardly toward but terminating at a point short of the tongue, and a flexible element connecting the forward end of each rod with the tongue ahead of said point.

7. A combination as in claim 6 in which each flexible element comprises a chain, there being a hook on the tongue adjustably but non-slidably engaged by each chain intermediate its ends.

8. A structure as in claim 5 in which the drag is at least the length of the roller unit and is substantially alined therewith in the direction of travel; draft connections between the drag and roller unit frame comprising flexible elements connected between the forward outer ends of said frame and the rear outer ends of said drag.

9. In the combination which comprises an elongated roller unit having a surrounding frame, a rigid tongue projecting forwardy and centrally from the frame, lateral extensions on said frame, a pair of roller units having central, forwardly projecting tongues connected with said extensions, said pair of rollers being mainly laterally and outwardly offset to said first named roller unit, and an elongated drag disposed ahead of said first named roller unit and beneath its tongue, said drag extending transversely of the direction of movement and of a length at least equal to the width of the effective path of all said roller units; draft connections between the drag and tongue which comprise elements flexible in part connecting between points on the drag symmetrically spaced from and on opposite sides of the tongue; and other draft connections which comprise chains connecting the rear outer ends of the drag with the forward outer ends of said pair of roller units.

10. In the combination which comprises an elongated roller unit having a surrounding frame, a rigid tongue projecting forwardy and centrally from the frame, lateral extensions on said frame, a pair of roller units having central, forwardly projecting tongues connected with said extensions, said pair of rollers being mainly laterally and outwardly offset to said first named roller unit, and an elongated drag disposed ahead of said first named roller unit and beneath its tongue, said drag extending transversely of the direction of movement and of a length at least equal to the width of the effective path of all said roller units; draft connections between the drag and tongue which comprise elements flexible in part connecting between points on the drag symmetrically spaced from and on opposite sides of the tongue; and other draft connections which comprise chains connecting the rear outer ends of the drag with the forward outer ends of said pair of roller units, and other chains connecting the forward outer ends of said first named roller unit with the adjacent portions of the drag.

11. An earth working implement comprising an elongated frame having end beams, a roller unit extending between said end beams and journaled in connection therewith, said roller unit including a relatively large diameter tubular section, whose ends are disposed short of but adjacent said end beams, a plurality of packer rings surrounding said section and extending in edge to edge relation for the full length thereof, and means securing the endmost rings to the section; said rings having outwardly projecting circumferentially spaced soil cultivation teeth.

THEODORE G. SCHMEISER.